(12) United States Patent
O'Reilly et al.

(10) Patent No.: US 6,849,664 B2
(45) Date of Patent: Feb. 1, 2005

(54) PROCESS FOR DISPOSING BIOCIDE-CONTAINING COOLING WATER

(75) Inventors: Kirk T. O'Reilly, El Sobrante, CA (US); Michael E. Moir, San Rafael, CA (US); Dennis J. O'Rear, Petaluma, CA (US); Richard O. Moore, Jr., San Rafael, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 09/982,702

(22) Filed: Oct. 18, 2001

(65) Prior Publication Data

US 2003/0127399 A1 Jul. 10, 2003

(51) Int. Cl.$^7$ ............................ A01N 27/00; C02F 1/50; C07C 5/08; C07C 11/22

(52) U.S. Cl. ...................... 514/762; 514/789; 210/749; 210/764; 518/700; 518/712; 422/28; 422/29; 422/30; 585/250; 585/534; 585/538; 585/654

(58) Field of Search ................................ 514/762, 789, 514/693, 705, 772, 773, 974; 210/749, 764; 518/700, 712; 422/28, 29, 30; 585/250, 534, 538, 654

(56) References Cited

U.S. PATENT DOCUMENTS

| | | | |
|---|---|---|---|
| 3,642,578 A | * | 2/1972 | Hitzman et al. ............ 435/247 |
| 3,839,008 A | | 10/1974 | Shema et al. |
| 3,879,513 A | | 4/1975 | Shema et al. |
| 4,568,663 A | | 2/1986 | Mauldin |
| 4,686,317 A | * | 8/1987 | Quann et al. ............... 585/860 |
| 4,802,996 A | | 2/1989 | Mouché et al. |
| 5,108,621 A | | 4/1992 | Robins |
| 5,112,871 A | | 5/1992 | Austin |
| 5,120,856 A | | 6/1992 | James et al. |
| 5,125,967 A | | 6/1992 | Morpeth et al. |
| 5,128,045 A | | 7/1992 | Parsons et al. |
| 5,224,980 A | | 7/1993 | Austin et al. |
| 5,290,810 A | | 3/1994 | Austin |
| 5,315,009 A | | 5/1994 | Austin et al. |
| 5,364,874 A | | 11/1994 | Morpeth |
| 5,393,750 A | | 2/1995 | James et al. |
| 5,401,757 A | | 3/1995 | Backhouse et al. |
| 5,451,564 A | | 9/1995 | Austin et al. |
| 5,451,577 A | | 9/1995 | Morpeth |
| 5,464,851 A | | 11/1995 | Morpeth |
| 5,506,253 A | | 4/1996 | James et al. |
| 5,583,091 A | | 12/1996 | Backhouse et al. |
| 5,641,411 A | | 6/1997 | Williams et al. |
| 5,837,159 A | | 11/1998 | Farkas et al. |
| 6,001,274 A | | 12/1999 | Farkas et al. |
| 6,183,649 B1 | | 2/2001 | Fontana |

FOREIGN PATENT DOCUMENTS

| | | |
|---|---|---|
| EP | 0609079 A1 | 8/1994 |
| EP | 0921184 A1 | 6/1999 |
| EP | 1127846 A | 8/2001 |
| GB | 2 289 672 A | 11/1995 |
| WO | WO00/20534 A1 | 4/2000 |

OTHER PUBLICATIONS

Copy of Dutch Search Report Mailed Sep. 1, 2003.
U.S. Appl. No. 09/982,714, O'Reilly, et al., *Inhibition of Biological Degradation in Fischer–Tropsch Products*, Filed on Oct. 18, 2001.
U.S. Appl. No. 09/982,701, O'Reilly, et al., *Deactivatable Biocides in Ballast Water*, Filed on Oct. 18, 2001.
U.S. Appl. No. 09/982,699, O'Reilly, et al., *Deactivatable Biocides for Hydrocarbonaceous Products*, Filed on Oct. 18, 2001.
Bolch, C.J., et al., *Chemical and Physical Treatment Options to Kill Toxic Dinoflagellate Cysts in Ships' Ballast Water, J. Marine Env. Engg.*, vol. 1, 1993, pp. 23–29, Gordon and Breach Science Publishers, US.
Carey, F.A., et al., *Advanced Organic Chemistry, Chapter 2: Reactions of Carbon Nucleophiles with Carbonyl Groups The Mannich Reaction*, $2^{nd}$ edition, 1983, pp. 59–62. Plenum Press, New York.
Carlton, J.T., et al., *Shipping Study: The Role of Shipping in the Introduction of Nonindigenous Aquatic Organisms to the Coastal Waters of the United States (other than the Great Lakes) and an Analysis of Control Options, The National Sea Grant College Program/Connecticutt Sea Grant Project R/ES–6*, Report No. CG–D–11–95, Apr. 1995, National Technical Information Service, Springfield, VA.
De Montellano, P.R., et al., *Self–catalyzed Inactivation of Hepatic Cytochrome P–450 by Ethynyl, The Journal of Biological Chemistry*, vol. 255, No. 12, Jun. 25, 1980, pp. 5578–5585, American Society for Biochemistry and Molecular Biology, Baltimore, MD.
De Montellano, P.R., *Alkenes and Alkynes, Bioactivation of Foreign Compounds*, Chapter 5, 1985, pp. 121–155, Academic Press, Inc., New York.
*Global spread of microorganisms by ships, Brief Communications*, Nature, Nov. 2, 2000.
*Glutaraldehyde: The Right Biocide for Many Environments, Union Carbide Corporation*, 1999 Published by Union Carbide, Danbury CT.
Grab, L.A., et al., *Comparative Biocidal Efficacy vs Sulfate–Reducing Bacteria, Materials Performance*, vol. 32, No. 6, 1993, pp. 59–62, National Association of Corrison Engineers, Houston, TX.

(List continued on next page.)

Primary Examiner—S. Mark Clardy
Assistant Examiner—Frank I Choi
(74) Attorney, Agent, or Firm—Burns, Doane, Swecker & Mathis, L.L.P.

(57) ABSTRACT

The present invention relates to the use of deactivatable biocides in cooling water systems of industrial processes that require dissipation of heat. The present invention relates to methods of inhibiting growth and reproduction of microorganisms in the cooling water comprising adding the deactivatable biocides to the cooling water and irreversibly deactivating the deactivatable biocides before or upon disposal of the cooling water.

10 Claims, No Drawings

OTHER PUBLICATIONS

Hudgins, C.M., Jr., *Chemical Treaments and Usage in Offshore Oil and Gas Production Systems, Journal of Petroleum Technology*, vol. 44, No. 5, May 1992, pp. 604–611, Society of Petroleum Engineers, Richardson, TX.

Hyman, M.R., et al., *Acetylene Inhibion of Metalloenzymes, Analytical Biochemistry*, vol. 173, No. 2, 1988, pp. 207–220, Academic Press, Inc., New York.

Leung, Hon–Wing, *Ecotoxicology of Glutaraldehyde: Review of Environmental Fate and Effects Studies, Ecotoxicology and Environmental Safety*, 49, 26–39, 2001, Section B, pp 26–39, Academic Press.

*Methods for Measuring the Acute Toxicity of Effluents and Receiving Waters to Freshwater and Marine Organisms*, 4th Edition, EPA/600/4–90/027F, Aug. 1993, United States Environmental Protection Agency, Reproduced by: National Technical Information Service, U.S. Dept. of Commerce, Springfield, VA.

Morrison, R.T., et al., *Organic Chemistry*, 2nd edition, 1966, pp. 631–632, Allyn and Bacon, Inc., Boston.

Roets, Piet, et al., *Stability and Handling of SASOL Semi–Synthetic Jet Fuel*, 6th *International Conference on Stability and Handling of Liquid Fuels*, Vancouver, B.C., Canada, Oct. 13–17, 1997, pp. 789–804, Publisher National Technical Information Services, Springfield, Virginia.

Prior, S.D., et al., *Acetylene as a suicide substrate and active site probe for methane monooxygenase from Methylococcus capsulatus (Bath), Federation of European Microbiological Societies: Microbiology Letters*, vol. 29, 1985, pp. 105–109, Elsevier/North Holland, Amsterdam.

Stirling, D.I., et al., *Effect of Metal–Binding Agents and Other Compounds on Methane Oxidation by Two Strains of Methyloccoccus capsulatus, Archives of Microbiology*, vol. 114, 1977, pp. 71–76, Springer–Verlag.

Yeager, C.M., et al., *Inactivation of Toluene 2–Monooxygenase in Burkholderia cepacia G4 by Alkynes, Applied & Environmental Microbiology*, vol. 65, No. 2, Feb. 1999, pp. 632–639, American Society for Microbiology.

\* cited by examiner

PROCESS FOR DISPOSING BIOCIDE-CONTAINING COOLING WATER

FIELD OF THE INVENTION

The present invention relates to the use of deactivatable biocides in cooling water systems used, for example, in petroleum refining, petrochemical plants, power generating stations, and the like.

BACKGROUND OF THE INVENTION

Industry is a large consumer of fresh water, and the majority of the water used in industry is used is for cooling. Almost all industry incorporates processes that require dissipation of heat, and cooling water is the most common substance used to dissipate unwanted heat. Power cannot be generated, gasoline cannot be produced, and chemical processes cannot operate without the use of cooling water.

In petroleum refining and petrochemical plants, large amounts of cooling water are needed. By way of example, combustible liquid fuels can be prepared from natural gas. This preparation involves converting the natural gas, which is mostly methane, to synthesis gas, or syngas, which is a mixture of carbon monoxide and hydrogen. Fischer-Tropsch chemistry is typically used to convert the syngas to a product stream that includes combustible fuel, among other products. These processes are known as Gas to Liquids (GTL) processes. In GTL processes, large amounts of heat are released in the conversion of natural gas to hydrocarbons; therefore, these plants need large amounts of cooling water.

In a cooling water system, heat exchange is the method by which unwanted heat generated by the process is removed from the system. The cooling water acts as a heat transfer medium in the process. Heat is removed in a cooling tower in two ways. First, it is removed by simple heat exchange between the air and the cooling water. Second, the heat is removed by evaporative heat transfer. After removing heat from the system, the cooling water may be cooled and reused or it may be disposed. Although cooling water may be reused and recirculated for a period of time, eventually evaporation of the cooling water concentrates salts in the cooling water system. The increased salt content increases corrosion problems and the increasing salts may exceed their solubility limits. Therefore, cooling water with increasing salt content eventually requires disposal.

Cooling water requires the use of biocides. Microorganisms or microbes can grow rapidly in cooling water. The warm water and air rich environments provide an ideal environment for microorganisms to multiply. Microorganisms can seriously hamper efficient removal of heat from the system as well as potentially cause structural damage to the system. Therefore, biocides are commonly used to control microbial growth in cooling water systems.

When the cooling water needs to be disposed, biocides present in the cooling water may create disposal problems. An efficient option for disposing of cooling water is directly discharging it into the environment, for example, into a river, lake, ocean, underground aquifer, and the like. However, when the cooling water contains residual biocide, this option may not be available because the biocide may have continuing antimicrobial effects after being released into the environment. Upon direct release into the environment, the biocide may kill or inhibit the growth of indigenous, and potentially desirable, bacteria, molds, fungi, and higher life forms. Therefore, the biocides may contaminate or pollute water supplies or require costly water treatment measures before the cooling water may be disposed.

Another option for disposing cooling water is discharging the water into a biological oxidation facility. However, biocides in the cooling water to be disposed can kill or inactivate the microorganisms used in the biological oxidation facility.

Accordingly, there is a need for appropriate biocides for cooling water and methods of inhibiting the growth and reproduction of microorganisms in cooling water in which the biocide can be deactivated or neutralized before or upon disposal of the cooling water.

SUMMARY OF THE INVENTION

The invention relates to the use of deactivatable biocides in cooling water. These deactivatable biocides can be deactivated or neutralized before or upon disposal of the cooling water to minimize potential environmental damage. The deactivatable biocide is deactivated or neutralized after the period in which biological growth is expected. Deactivation of the biocide minimizes environmental damage when the cooling water is introduced into the environment. The deactivatable biocide is irreversibly deactivated, i.e. the deactivatable biocide does not re-generate to become active upon release to the environment.

One aspect of the present invention is a method of inhibiting growth and reproduction of microorganisms in a cooling water system. In this method cooling water is provided. To the cooling water is added an effective amount of a deactivatable biocide to resist visible growth of microorganisms for at least 10 days under ambient conditions when exposed to a certified inoculant. Before or upon disposal of the cooling water, an effective amount of a neutralizing agent is added to deactivate the biocide. Deactivation of the biocide minimizes environmental damage when the cooling water is introduced into the environment. After deactivation of the biocide, the cooling water may be released directly into the environment or the cooling water may be treated in a biological oxidation facility. The deactivatable biocide is irreversibly deactivated and it does not re-generate to become active upon release to the environment.

An additional aspect of the present invention is a method of inhibiting growth and reproduction of microorganisms in a cooling water system for a Fischer Tropsch facility. In this method a Fischer-Tropsch synthesis process is performed generating Fischer-Tropsch-derived liquid products and large amounts of heat as a by-product. To dissipate the heat, a cooling water system comprising cooling water is utilized. To the cooling water system is added an effective amount of a deactivatable biocide to resist visible growth of microorganisms for at least 10 days under ambient conditions when exposed to a certified inoculant. Before or upon disposal of the cooling water, an effective amount of a neutralizing agent is added to deactivate the biocide. Deactivation of the biocide minimizes environmental damage when the cooling water is introduced into the environment. After deactivation of the biocide, the cooling water may be released directly into the environment or the cooling water may be treated in a biological oxidation facility. The deactivatable biocide is irreversibly deactivated and it does not re-generate to become active upon release to the environment.

The deactivatable biocide used in the Fischer Tropsch facility may be a Fischer-Tropsch-derived deactivatable biocide. If the biocide is a Fischer-Tropsch-derived deactivatable biocide, the method may also comprise the steps of synthesizing the Fischer-Tropsch-derived deactivatable biocide during a Fischer-Tropsch process, isolating the Fischer- Tropsch-derived deactivatable biocide, and adding the Fischer-Tropsch-derived deactivatable biocide to the cooling water.

Definitions:

Unless otherwise stated, the following terms used in the specification and claims have the meanings given below:

"Biocide" means any substance that kills or inhibits the growth of microorganisms, such as, for example, bacteria, molds, slimes, fungi, and the like.

"Syngas" is a mixture that includes hydrogen and carbon monoxide. In addition to these species, others may also be present, including, for example, water, carbon dioxide, unconverted light hydrocarbon feedstock, and various impurities.

"Integrated process" means a process comprising a sequence of steps, some of which may be parallel to other steps in the process, but which are interrelated or somehow dependent upon either earlier or later steps in the total process.

"Deactivatable biocide" means any biocide that can be deactivated or neutralized once the danger of microbial growth has ended. Deactivated or neutralized means that the biocide is no longer capable of killing or inhibiting the growth of microorganisms to any significant degree. Therefore, a deactivated biocide may be released into the environment with significantly reduced environmental risk. According to the present invention, the deactivatable biocide is irreversibly deactivated, i.e. the deactivable biocide does not re-generate to become active upon release to the environment.

"Fischer-Tropsch-derived deactivatable biocide" means a deactivatable biocide that may be generated as one of the many potential products of the Fischer-Tropsch synthesis process or may be generated as a component of the wastewater of the Fischer-Tropsch process. Fischer-Tropsch-derived biocides include, for example alkynes, oxygenates, and the like, and mixtures thereof.

"Fischer-Tropsch-derived liquid products" mean hydrocarbonaceous, liquid products derived from a Fischer-Tropsch process. Fischer-Tropsch-derived liquid products include, for example, Fischer-Tropsch naphtha, Fischer-Tropsch jet fuel, Fischer-Tropsch diesel fuel, Fischer-Tropsch solvent, Fischer-Tropsch lube base stock, Fischer-Tropsch lube base oil, Fischer-Tropsch lube base stock feedstock, and mixtures thereof.

"Heavy Fischer Tropsch product" means a product derived from a Fischer Tropsch process that boils above the range of commonly sold distillate fuels: naphtha, jet or diesel fuel. This means greater than 400° F., preferably greater than 550° F., and most preferably greater than 700° F. This stream may be converted to olefins by a thermal cracking process.

"Light Fischer Tropsch product" includes hydrocarbons boiling below about 700° F. (e.g., tail gases through middle distillates). It is largely in the $C_5$ to $C_{20}$ range with decreasing amount up to about $C_{30}$. The light product comprises paraffinic products with a significant portion of alcohols and olefins. In some cases the light product may comprise as much as 50%, and even higher, alcohols and olefins.

"Hydrocarbonaceous" means containing hydrogen and carbon atoms and potentially also containing heteroatoms, such as oxygen, sulfur, nitrogen, and the like.

"Hydrocarbonaceous Product" means any hydrocarbonaceous product, including both conventional hydrocarbonaceous products and those identified as rapidly biodegradable hydrocarbonaceous products. Hydrocarbonaceous products contain hydrogen and carbon atoms and may also contain heteroatoms, such as oxygen, sulfur, nitrogen, and the like. Conventional hydrocarbonaceous products include conventional petroleum products, for example, petroleum, diesel fuel, solvent, jet fuel, naphtha, lube base stock, lube base stock feedstock, and lube base oil.

"Neutralizing Agent" means any compounds or reaction conditions that may be used to react with a deactivatable biocide or to complex a deactivatable biocide to destroy the biocide's antimicrobial activity. A neutralizing agent effectively deactivates a biocide, thus neutralizing the biocide's antimicrobial effectiveness. According to the present invention, the neutralizing agent irreversibly deactivates the deactivatable biocide, i.e. the deactivatable biocide does not re-generate to become active upon release to the environment. Neutralizing agents may include, for example, nitrogen containing compounds, oxidation conditions, hydrogenation conditions, and the like.

"Organic Biocide" means any biocide containing hydrogen, carbon, and oxygen and not containing any significant degree of heteroatoms. Therefore, in an organic biocide sulfur, nitrogen, halogen, or metals may be present only as trace impurities. Organic biocides may include, for example, aldehydes (i.e., glutaraldehyde), alkynes (i.e., propargyl alcohol), and the like, and mixtures thereof.

"Oxygenates" mean hydrocarbon compounds containing oxygen, including, for example, alcohols, carboxylic acids, aldehydes, and the like.

"Paraffin" means any saturated hydrocarbon compound, i.e., an alkane with a chemical formula of $C_nH_{2n+2}$.

"Environment" or "natural environment" means any natural surroundings, including rivers, lakes, streams, oceans, underground aquifers and the like.

DETAILED DESCRIPTION OF ILLUSTRATIVE EMBODIMENTS

The present invention relates to the use of deactivatable biocides in cooling water. To avoid environmental and treatment concerns, the biocides of the present invention are ones that can be irreversibly deactivated before or upon disposal of the cooling water.

In the present invention, deactivatable biocides are added to cooling water in an amount effective to prevent visual growth of microorganisms. The deactivatable biocides of the invention are added to cooling water in an amount effective to prevent visible growth of microorganisms for at least 10 days under ambient conditions when exposed to a certified inoculant. Visual growth or formation of microorganisms may be measured quantitatively by measuring turbidity of the product in question. Turbidity is generally measured by using a turbidity meter, for example, a Hach Co. Model 2100 P Turbidimeter. A turbidity meter is a nephelometer that consists of a light source that illuminates a water/oil sample and a photoelectric cell that measures the intensity of light scattered at a 90° angle by the particles in the sample. A transmitted light detector also receives light that passes through the sample. The signal output (units in nephelometric turbidity units or NTUs) of the turbidimeter is a ratio of the two detectors. Meters can measure turbidity over a wide range from 0 to 1000 NTUs. The instrument must meet US-EPA design criteria as specified in US-EPA method 180.1.

By way of example, typical lube base oils measured at 75° F. have ranges of from 0 to 20 NTUs. Commercial Poly Alpha Olefins (PAOs) tend to have NTUs between 0 and 1. The visual formation of microorganisms is said to occur when the NTU value increases by two units from measurements made before and after microorganisms or inoculant are introduced into the sample. Measurements are made on the cooling water. Therefore, after treatment with an effective amount of deactivatable biocide the NTU value of the cooling water will not show an increase of two or more units in approximately ten days or less after introduction of an inoculant. According to the invention, the effective amount of deactivatable biocide added to the cooling water is at least 1 ppm biocide, preferably at least 10 ppm biocide, and more preferably at least 100 ppm biocide.

Use of the deactivatable biocides in cooling water according to the present invention eliminates the disposal and wastewater problems that accompany traditional use of biocides. According to the present invention, before the cooling water containing deactivatable biocides is disposed, the deactivatable biocides are irreversibly deactivated or neutralized by addition of a neutralizing agent. After the deactivatable biocides are irreversibly deactivated or neutralized, the cooling water may be disposed of by directly releasing the water into the environment without further treatment or fear of environmental damage. In the alternative, after the deactivatable biocides are irreversibly deactivated, the cooling water may be disposed of by treatment in a biological oxidation facility without prior treatment or complications due to active biocide. Deactivation of the biocide minimizes environmental damage when the cooling water is introduced into the environment. Deactivation, according the present invention, is an irreversible process, i.e., the process may not be reversed re-generating the active biocide.

According to the present invention, the biocides are deactivatable biocides to avoid environmental and treatment concerns. Deactivatable biocides of the invention include aldehydes, alkynes, and the like. Deactivatable biocides of the invention that are aldehydes include, for example, glutaradehyde, and deactivatable biocides of the invention that are alkynes, include, for example, 1-hexyne and propargyl alcohol.

By way of example, aldehydes are a preferred deactivatable biocide of the invention. While not being limited by theory, it is believed that aldehydes, including, for example, glutaraldehyde, act to inhibit growth of microorganisms by a mechanism similar to the Mannich reaction. By this mechanism, aldehydes, including, for example, glutaraldehyde, form complexes with non-hindered amines. These non-hindered amines include primary amines, ammonia, ammonium ions, or combinations thereof. In biological systems, these non-hindered amines may be amino acids. Cell walls of living organisms contain amino acids (non-hindered amines) that may provide a reactive site for aldehydes to react. Aldehydes may form cross-linking complexes with the amino acids on the cell surface, disrupting cellular function and killing the cells.

In particular, glutaraldehyde may be a preferred deactivatable biocide. Glutaraldehyde has rapid efficacy against a broad spectrum of microorganisms. Furthermore, glutaraldehyde is easily and uniformly diluted without the need for stabilizers or heavy metals. Glutaraldehyde is nonionic and thus is compatible with other chemicals. Glutaraldehyde also tolerates salts and hard water conditions. A further advantage of glutaraldehyde is that it may be irreversibly deactivated.

By way of example, alkynes (compounds with carbon-carbon triple bonds, $C\equiv C$) are another preferred deactivatable biocide of the invention. While not being limited by theory, it is believed that alkynes may act to irreversibly inhibit alkane oxidizing enzymes, including, for example, mono-oxygenase enzymes. Without alkane mono-oxygenase activity, microorganisms cannot survive. Primary alkynes have been shown to irreversibly inhibit alkane oxidizing enzymes, while secondary alkynes, $R-C\equiv C-R$, may be more effective on aromatic monooxygenases.

Alkynes may behave as "suicide substrates," and as such, activity of the oxidizing enzymes initiates the alkynes' inhibitory processes. The enzymes attempt to act on the alkynes, and this action causes irreversible binding of the alkynes to the active site of the enzyme. Binding of alkynes to the enzyme's active site inhibits the enzymes from causing further oxidation. Benefits of using alkynes as biocides in the present invention include their low inherent toxicity and their ability to be irreversibly deactivated.

By way of example, the alkynes used as biocides of the present invention may include, but are not limited to, 1-hexyne ($HC-C\equiv C_4H_9$), propargyl alcohol ($HC\equiv CCH_2OH$), and the like.

According to the present invention, the deactivatable biocides may be irreversibly deactivated by (a) reacting the biocide with a neutralizing agent to provide an inert or deactivated form of the biocide; or (b) complexing the biocide with a neutralizing agent to form a less toxic compound. As one of skill in the art will understand, the specific details of deactivation will depend on the particular deactivatable biocide used. The compounds, added in (a) to react with the biocide or in (b) to complex the biocide, are herein known as "neutralizing agents." The neutralizing agent according to the invention may be a compound, a series of compounds, or reaction conditions. According to the invention, the neutralizing agent may refer to compound(s) added to the biocide to irreversibly deactivate it or may refer to reaction conditions used to irreversibly deactivate the biocide. The neutralizing agents of the invention effectively and irreversibly deactivate the biocide. Deactivating the biocide means that the biocide no longer exhibits any significant degree of antimicrobial effects. Thus, the biocide may be released into the environment without affecting the growth of microorganisms or higher life forms. Furthermore, deactivation of the biocide is an irreversible process, i.e. the process may not be reversed re-generating the active biocide after it has been released into the environment.

By way of example, a deactivatable biocide of the present invention may be deactivated by reacting it with a neutralizing agent to provide an inert form. These reactions include, for example, oxidation and reduction. Oxidation can be accomplished by, for example, hydrogen peroxide, other organic peroxides, or an oxygenated halogen (for example, bleaches such as NaClO or $Ca(ClO)_2$). Oxidation is an effective means to deactivate virtually any type of biocide. Although oxidation may be an effective, convenient means of deactivating the biocide, use of halogenated oxidants may create the risk of introducing halogens into the cooling water and thus into the environment upon disposal of the cooling water. As one of skill in the art would understand, biocides and subsequent oxidants may be used in the present invention; however, it is important to choose the biocide and subsequent oxidant carefully. The oxidant should be selected such that it does not introduce unwanted by-products into the cooling water and thus into the environment upon disposal of the cooling water.

According to the invention, reduction of the biocide may also be an effective way to deactivate a biocide. By way of example, reduction of the biocide may be accomplished by hydrogenation. Hydrogenation may be an effective way to deactivate a biocide contained in cooling water. The process of hydrogenation is well known to those of skill in the art. Hydrogenation is performed using hydrogen gas. Typical catalysts for hydrogenation contain a Group VIII metal, such as platinum and palladium.

Complexing a biocide with a neutralizing agent may be used to form a less toxic compound and thus deactivate the biocide. When successful, the neutralizing agent is irreversibly complexed to the biocide to provide a compound that may be safely released into the environment. In determining neutralizing agents to complex with deactivatable biocides of the invention, the chemistry of the biocide's action to inhibit growth may be important.

By way of example, alkyne biocides may be effectively deactivated by hydrogenation. As a further example, to prevent aldehydes from attacking amino acids in the environment, aldehyde biocides, including, for example, glutaraldehyde, may be deactivated by irreversibly complexing or reacting them with nitrogen-containing compounds or oxygen scavengers. The nitrogen-containing compounds include, but are not limited to, primary amines, secondary amines, ammonia, amino alcohols, mixtures thereof, and the like. For example, glutaraldehyde may be deactivated by nitrogen-containing compounds including, for example, monoethanolamine, diethanolamine, methyldiethanolamine, diethylamine, aniline, and the like, and mixtures thereof.

An effective amount of neutralizing agent of the present invention is the amount that effectively deactivates or neutralizes the biocide rendering it virtually harmless to the environment and rendering it ineffectual to inhibit microbial growth. When an effective amount of neutralizing agent is used, the water containing the deactivated biocide may be safely released into the environment or processed in a facility. An effective amount of neutralizing agent to biocide is approximately 1 mole of neutralizing agent per mole of biocide. If excess neutralizing agent is used, the neutralizing agent may act as a biocide because it may be somewhat toxic. If much less neutralizing agent is added, it may not effectively deactivate or neutralize the biocide.

When the cooling water containing deactivatable biocide is to be neutralized, it is often important to measure the amount of biocide remaining in the cooling water. The amount of deactivatable biocide to be neutralized may be different than the initial amount added to the cooling water, as some of the biocide may have been lost or consumed. There are several ways to measure the deactivatable biocides in the cooling water, including, for example, gas chromatography, wet chemical test, mass spectroscopy, and other appropriate methods. Small tests using mixtures of the cooling water containing deactivatable biocide with the neutralizing agent added may be prepared and tested with certified inoculants to determine the optimum amount of neutralizing agent. For glutaraldehyde, there are kits that can be used to determine the concentration. For example, the Hach P.N. 25872-00 kit can be used to determine the concentration of glutaraldehyde in water in the range of 0.5 to 4000 ppm.

The extent of deactivation of the deactivatable biocide in the cooling water is in general sufficient to meet the local regulatory requirements. The extent of deactivation may also be judged by fish toxicity tests and microbial growth tests. In fish toxicity tests the cooling water containing deactivatable biocide with neutralizing agent added should show no significant toxicity within 1 hour, preferably within 6 hours, more preferably within 24 hours, and most preferably within 96 hours.

In microbial growth tests the cooling water containing deactivatable biocide with neutralizing agent added should support visible growth of microorganisms when placed in contact with a rapidly biodegradable substance within 10 days, preferably within 5 days and most preferably within 3 days. To perform this test, after the cooling water containing deactivatable biocide has been treated with an effective amount of neutralizing agent to deactivate the biocide, the cooling water is exposed to a certified inoculum, growth media, and rapidly biodegradable product under ambient conditions. For this testing the rapidly biodegradable substance may be a hydrocarbonaceous product. Visible growth of microorganisms is said to occur when the NTU value increases by two units from measurements made before and after the inoculant is introduced into the sample. Ambient conditions mean a temperature between 10° C. and 40° C. and a pH between 6 and 8.5.

As one of skill in the art would readily understand and be able to devise, deactivation of the biocide may be accomplished in a variety of ways. By way of example, the neutralizing agent may be added to the cooling water in a storage vessel when the water is no longer capable of being recycled for use and just prior to release into the environment. By way of example, the neutralizing agent may be added to the cooling water system directly, contacted with all or a portion of the cooling water that is to be disposed in a separate vessel or container, or added to a biological oxidation facility. As one of skill in the art would understand, a method to accomplish deactivation may be selected in view of the neutralizing agent, the biocide, and the cooling water system.

According to the present invention, a preferred process in which cooling water containing deactivatable biocides is used is a Fischer-Tropsch process. As described previously, the cooling water of a Fischer Tropsch process requires biocides to prevent growth and reproduction of microorganisms; however, the cooling water must eventually be disposed due to increasing salt content.

Fischer Tropsch processes convert natural gas, which is mostly methane, to synthesis gas, or syngas, which is a mixture of carbon monoxide and hydrogen. Catalysts and conditions for performing Fischer-Tropsch synthesis are well known to those of skill in the art, and are described, for example, in EP 0 921 184 A1. In the Fischer-Tropsch synthesis process, liquid and gaseous hydrocarbons are formed by contacting a synthesis gas (syngas) comprising a mixture of $H_2$ and CO with a Fischer-Tropsch catalyst under suitable temperature and pressure reactive conditions. The Fischer-Tropsch reaction is typically conducted at temperatures of from about 300° to 700° F. (149° to 371° C.), preferably from about 400° to 550° F. (204° to 228° C.); pressures of from about 10 to 600 psia, (0.7 to 41 bars), preferably 30 to 300 psia, (2 to 21 bars) and catalyst space velocities of from about 100 to 10,000 cc/g/hr., preferably 300 to 3,000 cc/g/hr.

The products may range from $C_1$ to $C_{200+}$ with a majority in the $C_5$ to $C_{100+}$ range, and the products may be distributed in one or more product fractions. The reaction can be conducted in a variety of reactor types, for example, fixed bed reactors containing one or more catalyst beds; slurry reactors; fluidized bed reactors; and a combination of different type reactors. Such reaction processes and reactors are well known and documented in the literature.

Slurry Fischer-Tropsch processes, which is a preferred process in the practice of the invention, utilize superior heat (and mass) transfer characteristics for the strongly exothermic synthesis reaction and are able to produce relatively high molecular weight, paraffinic hydrocarbons when using a cobalt catalyst. In a slurry process, a syngas comprising a mixture of $H_2$ and CO is bubbled up as a third phase through a slurry in a reactor which comprises a particulate Fischer-Tropsch type hydrocarbon synthesis catalyst dispersed and suspended in a slurry liquid comprising hydrocarbon products of the synthesis reaction which are liquid at the reaction conditions. The mole ratio of the hydrogen to the carbon monoxide may broadly range from about 0.5 to 4, but is more typically within the range of from about 0.7 to 2.75 and preferably from about 0.7 to 2.5. A particularly preferred Fischer-Tropsch process is taught in EP 0609079, incorporated herein by reference in its entirety.

Suitable Fischer-Tropsch catalysts comprise one or more Group VIII catalytic metals such as Fe, Ni, Co, Ru and Re. Additionally, a suitable catalyst may contain a promoter. Thus, a preferred Fischer-Tropsch catalyst comprises effective amounts of cobalt and one or more of Re, Ru, Pt, Fe, Ni, Th, Zr, Hf, U, Mg and La on a suitable inorganic support material, preferably one which comprises one or more refractory metal oxides. In general, the amount of cobalt present in the catalyst is between about 1 and about 50 weight percent of the total catalyst composition. The catalysts can also contain basic oxide promoters such as $ThO_2$, $La_2O_3$, MgO, and $TiO_2$, promoters such as $ZrO_2$, noble metals (Pt, Pd, Ru, Rh, Os, Ir), coinage metals (Cu, Ag, Au), and other transition metals such as Fe, Mn, Ni, and Re. Support materials including alumina, silica, magnesia and titania or mixtures thereof may be used. Preferred supports for cobalt containing catalysts comprise titania. Useful catalysts and their preparation are known and illustrative, but non-limiting examples may be found, for example, in U.S. Pat. No. 4,568,663.

The products from Fischer-Tropsch reactions performed in slurry bed reactors generally include a light reaction product and a waxy reaction product. The light reaction product (i.e. the condensate fraction) includes hydrocarbons boiling below about 700° F. (e.g., tail gases through middle distillates), largely in the $C_5$–$C_{20}$ range, with decreasing amounts up to about $C_{30}$. The waxy reaction product (i.e., the wax fraction) includes hydrocarbons boiling above 600° F. (e.g., vacuum gas oil through heavy paraffins), largely in the $C_{20}$+ range, with decreasing amounts down to $C_{10}$. Both the light reaction product and the waxy product are substantially paraffinic. The products generally comprise greater than 70% normal paraffins, and often greater than 80% normal paraffins. The light reaction product comprises paraffinic products with a significant proportion of alcohols and olefins. In some cases, the light reaction product may comprise as much as 50%, and even higher, alcohols and olefins. In the Fischer Tropsch process, the desired Fischer Tropsch products typically will be isolated by distillation.

The product from the Fischer-Tropsch process may be further processed using, for example, hydrocracking, hydroisomerization, and hydrotreating. Such processes crack the larger synthesized molecules into fuel range and lube range molecules with more desirable boiling points, pour points, and viscosity index properties. Such processes may also saturate oxygenates and olefins to meet the particular needs of a refinery. These processes are well known in the art and do not require further description here.

A preferred Fischer-Tropsch product of a Fischer Tropsch process is a Fischer Tropsch derived liquid product and a preferred product of a Fischer Tropsch process has a branching index of less than five, preferably less than four, more preferably less than three. Fischer-Tropsch (FT) derived products include, for example, Fischer-Tropsch naphtha, Fischer-Tropsch jet fuel, Fischer-Tropsch diesel fuel, Fischer-Tropsch solvent, Fischer-Tropsch lube base stock, Fischer-Tropsch lube base oil, Fischer-Tropsch lube base stock feedstock, and mixtures thereof.

As described previously, the Fischer Tropsch process requires the use of cooling water to dissipate heat generated as a by-product during the production of desired Fischer-Tropsch liquid products. The cooling water used as part of the Fischer Tropsch process needs biocides to prevent unwanted growth and reproduction of microorganisms. According to the present invention, products from a Fischer Tropsch process may be used as deactivatable biocides in the cooling water of a Fischer Tropsch process. The Fischer-Tropsch process may provide products that may be isolated and used directly as deactivatable biocides and products that may be isolated and converted into deactivatable biocides by chemical processes well know to those of skill in the art, including for example, oxidation, dehydration, and/or dehydrogenation. The deactivatable biocides prepared from a Fischer Tropsch process are herein identified as "Fischer Tropsch derived deactivatable biocides." Fischer Tropsch products that may be used to provide Fischer Tropsch derived deactivatable biocides include, for example, oxygenates (including alcohols, aldehydes, and carboxylic acids), olefins, alkynes, and mixtures thereof.

Olefins and oxygenates may be derived from light Fischer Tropsch products. In addition, olefins may be formed, for example, by a thermal cracking process performed on heavy Fischer Tropsch products. Furthermore, oxygenates may be generated as a component of the waste-water generated as part of the Fischer-Tropsch process.

By way of example, the olefins and oxygenates derived from a Fischer Tropsch process may be used to provide aldehydes and alkynes by chemical processes which include oxidation and/or dehydrogenation. One of skill in the art would readily be able to devise methods to generate and isolate olefins and oxygenates from a Fischer-Tropsch process and convert these olefins and oxygenates to aldehydes and alkynes. Alternatively, waste-water generated in the Fischer-Tropsch process may contain a variety of oxygenated hydrocarbons. These oxygenated hydrocarbons may also be used directly or used to generate aldehydes.

Accordingly, a Fischer Tropsch process may be used to generate Fischer Tropsch derived liquid products and Fischer Tropsch derived deactivatable biocides for use in the cooling water to dissipate heat from a Fischer Tropsch facility. The deactivatable biocides used in Fischer Tropsch processes preferably are ones derived from the Fischer Tropsch process. Deriving the deactivatable biocide from the Fischer Tropsch process serves several benefits. It removes olefins and oxygenates from the Fischer Tropsch feedstock reducing the amount of potential catalyst poisons in the stream. It also provides a method of converting Fischer Tropsch products into biocides increasing the overall efficiency of the Fischer Tropsch process. Furthermore, Fischer-Tropsch-derived biocides do not have to be purchased from a third party, do not have to be generated at a remote location, and do not have to be shipped from a remote location to the Fischer Tropsch process site.

The present invention also relates to methods of inhibiting the growth and reproduction of microorganisms in cooling water used in any industrial process. In these methods cooling water is provided for use in dissipating heat from an industrial process. To the cooling water is added an effective amount of a deactivatable biocide to resist visible growth of microorganisms for at least 10 days under ambient conditions when exposed to a certified inoculant. Resisting visible growth for at least 10 days means that the visual formation of microorganisms does not occur for at least 10 days. As explained previously, visual growth of microorganisms is said to occur when the NTU value increases by two units from measurements made before and after the inoculant introduced into the sample. Therefore, resisting visual growth for at least 10 days means that the NTU value does not increase by two units. A certified inoculant consists of a source of bacteria initially isolated at ambient conditions using a rapidly biodegradable hydrocarbonaceous product as the sole source of carbon and energy, and that has been shown to grow on the hydrocarbonaceous product through two or more successive inoculations. Ambient conditions mean a temperature between 10 and 40° C. and a pH between 6 and 8.5.

In this method, before or upon disposal of the cooling water, an effective amount of a neutralizing agent is added to deactivate the biocide. After the biocide is effectively deactivated, the cooling water may be directly released into the environment or treated at a biological oxidation facility. After the biocide is effectively deactivated, the cooling water supports growth of microbial organisms in less than 10 days under ambient conditions when exposed to a certified inoculum, growth media, and a hydrocarbonaceous product. Preferably, the cooling water containing deactivated biocide will support growth of microbial organisms in less than 5 days. Deactivation of the biocide minimizes environmental damage when cooling water is introduced into the environment.

The present invention preferably relates to a method of inhibiting the growth and reproduction of microorganisms in a cooling water system for a Fischer Tropsch facility. In this method a Fischer Tropsch synthesis is performed generating Fischer-Tropsch-derived liquid products and large amounts of heat. The products recovered from the Fischer-Tropsch process may range from $C_5$ to $C_{20+}$ and may be distributed in one or more product fractions. In the Fischer Tropsch process, the desired Fischer Tropsch product typically will be isolated by distillation.

To dissipate the heat, cooling water is provided. To the cooling water is added an effective amount of deactivatable biocide to resist visible growth of microorganisms for at least 10 days under ambient conditions when exposed to a certified inoculant. The deactivatable biocide is preferably a Fischer-Tropsch-derived biocide. If the biocide is a Fischer-Tropch-derived biocide, the Fischer Tropsch process may be used to provide both the biocide and Fischer-Tropsch derived liquid products. An appropriate biocide may be isolated from the products of the Fischer Tropsch process directly, for example, by distillation or chromatographic separation. In the alternative, appropriate products may be isolated from the Fischer Tropsch process and chemical processes may be used to provide deactivatable biocides from these products. The appropriate products used to provide deactivatable biocides may include olefins and/or alcohols, and the chemical processes may include dehydration, dehydrogenation, and/or oxidation. It is preferred and efficient to use a Fischer-Tropsch-derived biocide in the cooling water for a Fischer Tropsch facility because the biocide may be produced on site by the Fischer-Tropsch process.

The method also includes the step of adding a neutralizing agent to deactivate the biocide before or upon disposal of the cooling water. The biocide is irreversibly deactivated, i.e., the biocide does not re-generate to become active upon release to the environment. After the biocide has been deactivated, the cooling water may be directly released into the environment or treated in a biological oxidation.

EXAMPLES

The invention will be further explained by the following illustrative examples that are intended to be non-limiting.

Example 1

Certification of the Inoculum for Determining the Effectiveness of Biocide Neutralization The purpose of this example was to develop a certified inoculum that can be used to determine the activity of biocides in a cooling water stream to be deactivated and the effectiveness of neutralizing agents on the biocides. Microorganisms were selected that will degrade hydrocarbons (Fischer Tropsch diesel fuel or $n-C_{16}$) thus simulating the hydrocarbons that would be found in a biological oxidation facility and/or the environment.

Inoculum Development: The original alkane degrading culture was produced by growing microorganisms from a variety of sources including soils and water known to be contaminated with crude oil and petroleum products. A few micrograms of each source material were added to the minimal medium described below using Fischer-Tropsch diesel as the carbon source. After substantial growth was observed, organisms were removed from the suspension by pipette and added to fresh minimal medium containing Fischer-Tropsch diesel as the carbon source. This source of organisms was used for subsequent experiments. $n-C_{16}$ could also be used as a carbon source for developing the inoculum.

To determine if the inoculum and other factors of the test, such as growth medium, are suitable for use in determining the speed of biodegradation, $n-C_{16}$ was obtained from Aldrich Chemical company, and used as a standard hydrocarbon representative of rapidly biodegradable hydrocarbonaceous products.

Growth Media: A standard minimal media containing only inorganic nutrients required for bacterial growth was used. The medium used to supply inorganic micronutrients to the growing culture of alkane degrading organisms consists of 0.1 g/L $MgSO_4.7H_2O$, 0.5 g/L $NaNO_3$, 0.02 mM $FeSO_4$ and 0.63 g/L $K_2HPO_4$ and 0.19 g/L $KH_2PO_4$ to achieve a pH of 7 to 7.3.

Test Conditions: 90 ml of media and 10 ml of the product to be tested (n-C16) were added to 250 ml flasks. 100 $\mu$l of the bacterial inoculum was added to each flask. After inoculation, the flasks were placed on a shaker-table (135 rpm) at room temperature in contact with air and observed daily.

The $n-C_{16}$ showed visual growth of microorganisms at three days in the water phase. Visual growth of microorganisms with $n-C_{16}$ under these test conditions at less than 4 days demonstrates that the inoculum is certified for determining the speed of biodegradation in this application, and that other factors in the experiment are suitable for this application.

The visual formation of microorganisms can also be measured quantitatively by measuring the turbidity. Turbidity is generally measured by using a turbidity meter, such as a Hach Co. Model 2100 P Turbidimeter. A turbidity meter is a nephelometer that consists of a light source that illuminates a water/lube base oil sample and a photoelectric cell that measures the intensity of light scattered at a 90° angle by the particles in the sample. A transmitted light detector also receives light that passes through the sample. The signal output (units in nephelometric turbidity units or NTUs) of the turbidimeter is a ratio of the two detectors. Meters can measure turbidity over a wide range from 0 to 1000 NTUs. The instrument must meet US-EPA design criteria as specified in US-EPA method 180.1.

Typical lube base oils measured at 75° F. have ranges from 0–20 NTUs. Commercial Poly Alph Olefins (PAOs) tend to have NTUs between 0–1.

When the appearance of the oils is examined (in simulation of a customer's opinion) the following relates the value of the NTU and the appearance:

| NTU Value | Appearance |
| --- | --- |
| 20 | Cloudy |
| 2–5 | Possibly acceptable, but noticeable haze |
| 0.5–2 | Clear and bright |

References:
  drinking water must be <1.0
  recreational water must be <5.0

The visual formation of microorganisms is said to occur when the NTU value increases by two units from measurements made before the microorganisms were introduced into the sample.

Comparative Example 2

Neutralization of Biocides—$H_2O_2$ and $NH_4Cl$

This example demonstrates that $H_2O_2$ and $NH_4Cl$ are not effective in neutralizing biocides and in producing a water stream that supports microbial growth that is consistent with the operation of a biological oxidation facility. In this experiment, minimal medium, containing 1, 10 or 100 ppm of glutaraldehyde, were mixed with a five times molar excess of $H_2O_2$ or $NH_4Cl$. Hydrocarbonaceous product and bacteria were then added to the mixture. While microbial growth was observed after 5 days in control samples containing no glutaraldehyde, no growth was observed after 14 days in samples containing glutaraldehyde and $H_2O_2$ or $NH_4Cl$. This lack of growth demonstrates that these species were ineffective in neutralizing the glutaraldehyde. Presumably, the $H_2O_2$ remained toxic, and the $NH_4Cl$ did not form a complex with the glutaraldehyde.

Example 3

Neutralization of Biocides with Monoethanolamine

This example demonstrates that amines and amino-alcohols can be used to neutralize biocides. The optimum amount of neutralizing agent to biocide is approximately 1 mole per 1 mole. If excess neutralizing agent is added, it too can act as a biocide because it is toxic, although much less so than the biocide itself. If a large amount of biocide is added (100 ppm or more of glutaraldehyde), the amount of amine added should be fairly close to a 1:1 molar ratio to avoid toxicity problems from the neutralizing amine.

In all experiments, a 10:1 ratio of minimal media to Fischer-Tropsch diesel fuel were prepared and evaluated in 250 ml flasks. To the flasks, various levels of glutaraldehyde (G) and monoethanolamine (MEA) were added.

|  | 5X MEA | 2X MEA | 1X MEA | no MEA |
| --- | --- | --- | --- | --- |
| 100 ppm G | X | X | X | X |
| 10 ppm G | X | X | X | X |
| 1 ppm G | X | X | X | X |

Then, 10 µl of the bacterial inoculum was added to each flask.

In addition to these experiments, several controls were run without Glutaraldehyde as follows:

1 ppm MEA control 10 ppm MEA control 100 ppm MEA control 500 ppm MEA control no G/no MEA control The results of these experiments are shown below in Table I.

TABLE I

Neutralization of Biocides with MEA.

| | Time (days) | | | | | | |
| --- | --- | --- | --- | --- | --- | --- | --- |
| | 0 | 1 | 2 | 3 | 7 | 9 | 14 |
| 100 ppm G + 5X MEA | − | − | − | − | − | − | − |
| +2X MEA | − | − | − | − | − | − | − |
| +1X MEA | − | − | − | − | + | + | + |
| no MEA | − | − | − | − | − | − | − |
| 10 ppm G + 5X MEA | − | − | − | − | + | + | + |
| +2X MEA | − | − | − | + | + | + | + |
| +1X MEA | − | − | − | − | + | + | + |
| no MEA | − | − | − | − | − | − | − |
| 1 ppm G + 5X MEA | − | − | − | − | + | + | + |
| +2X MEA | − | − | − | + | + | + | + |
| +1X MEA | − | − | − | − | + | + | + |
| no MEA | − | − | − | − | − | + | + |
| Controls: | | | | | | | |
| 1 ppm MEA | − | − | − | + | + | + | + |
| 10 ppm MEA | − | − | − | + | + | + | + |
| 100 ppm MEA | − | − | − | − | − | − | + |
| 500 ppm MEA | − | − | − | − | − | − | + |
| no G/no MEA | − | − | − | + | + | + | + |

− No Growth
+ Growth

The control results without MEA and without glutaraldehyde shows growth in 3 days as expected. Low levels of MEA in the controls (less than 100 ppm) are not significantly toxic and do not delay the onset of microbial growth. High levels of MEA in the control (100 ppm and higher) are toxic and do delay the onset of microbial growth.

In general, the results demonstrate that adding an equal molar amount of MEA to glutaraldehyde is effective in neutralizing the glutaraldehyde and permitting microbial growth. This is an indication that the biocide has been neutralized, and the water containing the neutralized biocide could safely be discharged or processed in a biological oxidation facility.

The results also show that 1 ppm of glutaraldehyde is moderately effective in delaying the onset of microbial growth—delayed from 3 days to 9 days. 10 ppm is more effective—delayed from 3 days to more than 14 days.

At low levels of glutaraldehyde (below 100 ppm), less than 5 moles MEA to glutaraldehyde are needed to be effective in neutralizing the glutaraldehyde and to yield a water fraction that permits microbial growth, and so by inference is safe to discharge or treat in on-shore facilities. The minimum ratio of MEA to glutaraldehyde is below 1.0 and may be as low as 0.2. However, further routine experiments would be needed to define this lower limit.

At high levels of glutaraldehyde (100 ppm and above), a precise amount of MEA, approximately equal to 1 mole of MEA to glutaraldehyde, is needed to yield a water fraction that permits microbial growth, and so by inference is safe to discharge or treat in on-shore facilities. Excessive amounts of either glutaraldehyde or MEA would yield a water phase that did not permit microbial growth.

Experiment 4

Neutralization of Biocides with Other Nitrogen Compounds

A series of different nitrogen-containing compounds were evaluated as materials to neutralize glutaraldehyde. For these experiments, 10:1 ratio of minimal media to n-$C_{16}$ were prepared, mixed with 10 ppm of glutaraldehyde (G) and evaluated in 250 ml flasks. The different nitrogen-containing compounds evaluated include the following:

Monoethanolamine (MEA)
Diethanolamine (DEA)
Methyldiethanolamine (MDEA)
Diethylamine (DA)
Aniline (A)

Two moles of each of the nitrogen-containing compound to glutaraldehyde were added to the flasks. Then 10 µl of the bacterial inoculum was added to each flask. The results are shown below in Table II.

Control samples were also run with the nitrogen-containing compound and without the glutaraldehyde. These control samples permitted an assessment of the toxicity of the nitrogen-containing compound.

TABLE II

Neutralization of Biocides with Nitrogen Compounds

| | Time (days) | | | | | | | |
|---|---|---|---|---|---|---|---|---|
| | 0 | 1 | 2 | 6 | 7 | 9 | 13 | 20 |
| with MEA | − | − | − | + | + | + | + | + |
| MEA control | − | − | − | − | + | + | + | + |
| with DEA | − | + | + | + | + | + | + | + |
| DEA control | − | − | − | + | + | + | + | − |
| with MDEA | − | − | − | − | + | + | + | + |
| MDEA control | − | − | − | + | + | + | + | + |
| with diethylamine | − | − | − | + | + | + | + | + |
| Diethylamine control | − | − | − | + | + | + | + | + |
| with aniline | − | − | − | − | − | − | − | − |
| aniline control | − | − | − | − | − | − | − | − |
| Control: no G/no amine | − | − | − | + | + | + | + | + |

− No Growth
+ Growth

These results show that MEA, DEA, MDEA, and diethylamine are all effective in neutralizing 10 ppm of glutaraldehyde. Furthermore, these nitrogen-containing compounds are not excessively toxic themselves and permit microbial growth even in the absence of glutaraldehyde. In contrast, aniline is excessively toxic and does not permit microbial growth in experiments with or without glutaraldehyde.

Experiment 5

Comparing the Acute Toxicity of Glutaraldehyde and Glutaraldehyde Neutralized with Mono-Ethanolamine (MEA) to Larval Sheepshead Minnow (Cyprinodon variegatus)

In a control experiment, the acute toxicity of separate biocide (glutaraldehyde) and neutralizing agent (MEA) was measured in a 96 h static bioassay test (Methods for Measuring the Acute Toxicity of Effluent and Receiving Waters to Freshwater and Marine Organisms, 4th edition. EPA/600/4-90/027F Washington, D.C.) conducted at Pacific Eco-Risk Laboratories, Martinez, Calif. The results are summarized in Table III below.

TABLE III

Acute Toxicity measured on Larval Sheepshead Minnow (Cyprinodon variegatus)

| Compound | LC-50 (mg/L) | LOEC (mg/L) | NOEC (mg/L) |
|---|---|---|---|
| Glutaraldehyde | 26 | 25 | 13 |
| Monoethanolamine | 1500 | 1700 | 1000 |

LOEC is the Lowest Observable Effect Concentration and is defined as the minimum concentration where mortality is observed for the test species. NOEC is the No Observable Effect Concentration and is defined as the highest concentration tested where no mortality was observed in the test species. LC-50, the concentration that will cause mortality of 50% of the organisms tested within 96 h, is a calculated value based on all observations.

In a second experiment, the toxicity of glutaraldehyde in the presence and absence of MEA was measured and compared. Based on the results of the control experiment above, solutions having the concentrations of glutaraldehyde and MEA listed in Table IV below were prepared in the fish bioassay media provided by the testing laboratory. The solutions were mixed for 48 hours prior to the start of the bioassays. The solutions were diluted to perform bioassays at starting glutaraldehyde concentrations of 100, 50, 37.5, 25, and 10.5 mg/L. The results are summarized in Table IV.

TABLE IV

Acute Toxicity measured on Larval Sheepshead Minnow (Cyprinodon variegatus)

| Glutaraldehyde (mg/L) | MEA (mg/L) | Glutaraldehyde: MEA Molar Ratio | LC50 (mg/L) |
|---|---|---|---|
| 100 | 0 | — | 25 |
| 100 | 62.5 | 1:1 | >100 |
| 100 | 125 | 1:2 | >100 |

The toxicity glutaraldehyde alone was found to be the same as that determined in the control experiment. Surprisingly no fish mortality was observed at any of the test concentrations where MEA was added. Consequently the LC50 for the neutralized biocide is greater than the maximum concentration tested or 100 mg/L. This is consistent with the observations made on hydrocarbon degrading microorganisms. Thus, cooling water treated by such a technique would have significantly reduced glutaraldehyde toxicity when discharged into the environment or processed in a biological oxidation facility.

While the invention has been described in detail and with reference to specific embodiments thereof, it will be apparent to one skilled in the art that various changes and modifications can be made without departing from the spirit and scope of the invention.

What is claimed is:

1. A method of inhibiting growth and reproduction of microorganisms in a cooling water system for a Fischer Tropsch facility, comprising the steps of:
   a) providing cooling water;

b) performing a Fischer-Tropsch synthesis process to provide a product stream;

c) fractionally distilling the product stream and isolating liquid hydrocarbonaceous products and olefins;

d) subjecting the olefins to dehydrogenation to form alkynes;

e) adding an effective amount of the alkynes to the cooling water to resist visible growth for at least 10 days under ambient conditions when exposed to a certified inoculant; and f) adding an effective amount of a neutralizing agent, wherein the neutralizing agent is a hydrogenation catalyst and $H_2$, to the cooling water to irreversibly deactivate the alkynes before or upon disposal of the cooling water, such that after the neutralizing agent is added, the cooling water supports visible growth of microorganisms in less than 10 days when exposed to a certified inoculum, growth media, and rapidly biodegradable substance under ambient conditions.

2. A method according to claim 1, wherein the alkynes are added in an amount of at least 100 ppm.

3. A method according to claim 1, wherein the alkynes are primary alkynes and the neutralizing agent is a hydrogenation catalyst and $H_2$.

4. A method according to claim 1, wherein the olefins are formed from a thermal cracking process which uses a heavy Fischer Tropsch feed derived from a Fischer Tropsch process.

5. A method according to claim 1, wherein the olefins are isolated from light Fischer Tropsch products.

6. A method according to claim 1, wherein the alkynes are added in an amount of at least 1 ppm.

7. A method according to claim 1, wherein the alkynes are added in an amount of at least 10 ppm.

8. A method according to claim 1, further comprising a step (g) releasing the cooling water into a natural environment after the alkynes have been irreversibly deactivated.

9. A method according to claim 1, further comprising a step (g) discharging the cooling water into a biological oxidation facility.

10. A method according to claim 1, wherein after the neutralizing agent is added, the cooling water supports visible growth of microorganisms in less than 5 days when exposed to a certified inoculum, growth media, and rapidly biodegradable substance under ambient conditions.

* * * * *